(12) United States Patent
Tokura et al.

(10) Patent No.: US 9,428,217 B2
(45) Date of Patent: Aug. 30, 2016

(54) STEERING APPARATUS

(71) Applicant: Showa Corporation, Gyoda-shi (JP)

(72) Inventors: Shinichi Tokura, Haga-gun (JP); Ryo Takahashi, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/606,571

(22) Filed: Jan. 27, 2015

(65) Prior Publication Data
US 2015/0274195 A1  Oct. 1, 2015

(30) Foreign Application Priority Data
Mar. 27, 2014  (JP) ................. 2014-067197

(51) Int. Cl.
| B62D 3/12 | (2006.01) |
| B62D 5/04 | (2006.01) |
| F16C 29/02 | (2006.01) |
| F16C 33/08 | (2006.01) |
| F16C 35/02 | (2006.01) |

(52) U.S. Cl.
CPC ............. B62D 3/126 (2013.01); B62D 3/12 (2013.01); B62D 5/0409 (2013.01); F16C 29/02 (2013.01); F16C 33/08 (2013.01); F16C 35/02 (2013.01)

(58) Field of Classification Search
CPC ....... B62D 3/126; B62D 3/12; B62D 5/0409
USPC .......................................................... 180/444
See application file for complete search history.

(56) References Cited

U.S. PATENT DOCUMENTS

| 5,181,581 A * | 1/1993 | Engler ................ B62D 5/062 180/417 |
| 5,694,810 A * | 12/1997 | Iwasa ..................... B62D 5/12 74/109 |
| 6,041,885 A * | 3/2000 | Watanabe ............... B62D 3/12 180/444 |
| 6,155,375 A * | 12/2000 | Gierc ..................... B62D 5/22 180/428 |
| 6,330,929 B1 * | 12/2001 | Gierc ..................... B62D 5/22 180/428 |
| 6,644,430 B2 * | 11/2003 | Harer .................... F16J 3/042 180/417 |
| 6,848,534 B2 * | 2/2005 | Toyofuku ............ B62D 5/0427 180/443 |
| 7,334,660 B2 * | 2/2008 | Damore ................. B62D 5/22 180/428 |
| 7,367,421 B2 * | 5/2008 | Saito ..................... B62D 3/12 180/426 |

(Continued)

FOREIGN PATENT DOCUMENTS

JP           11-198827 A       7/1999

*Primary Examiner* — Kevin Hurley
*Assistant Examiner* — Michael Stabley
(74) *Attorney, Agent, or Firm* — Leason Ellis LLP

(57) ABSTRACT

To suppress the loosening of a bush when an ambient temperature varies. A motor-driven power steering apparatus according to the present invention includes a rack shaft moving steered portions based on the steering in a steering wheel, an end case covering the rack shaft and having an inner peripheral groove along a circumferential direction of the rack shaft on an inner peripheral surface facing the rack shaft and a bush arranged inside the inner peripheral groove of the end case and supporting the rack shaft so as to slide. Here, an outer peripheral surface of the bush includes a first protrusion and a second protrusion protruding toward a bottom portion of the inner peripheral groove at different positions in an axial direction of the rack shaft. The bottom portion of the inner peripheral groove includes a first groove and a second groove receiving the first protrusion and the second protrusion.

18 Claims, 7 Drawing Sheets

(56) References Cited

U.S. PATENT DOCUMENTS

| | | | | | |
|---|---|---|---|---|---|
| 7,665,747 B2* | 2/2010 | Arlt | ............ | B62D 3/12 |
| | | | | 280/93.514 |
| 8,205,515 B2* | 6/2012 | Robertson | ............ | B62D 5/22 |
| | | | | 384/278 |
| 8,813,594 B2* | 8/2014 | Amada | ............ | B62D 3/123 |
| | | | | 74/388 PS |
| 2006/0266140 A1* | 11/2006 | Harer | ............ | B62D 5/22 |
| | | | | 74/89.12 |
| 2007/0262530 A1* | 11/2007 | Heo | ............ | B62D 5/22 |
| | | | | 277/345 |
| 2013/0036845 A1* | 2/2013 | Amada | ............ | B62D 3/123 |
| | | | | 74/30 |
| 2013/0247696 A1* | 9/2013 | Imamura | ............ | F16H 55/283 |
| | | | | 74/30 |

* cited by examiner

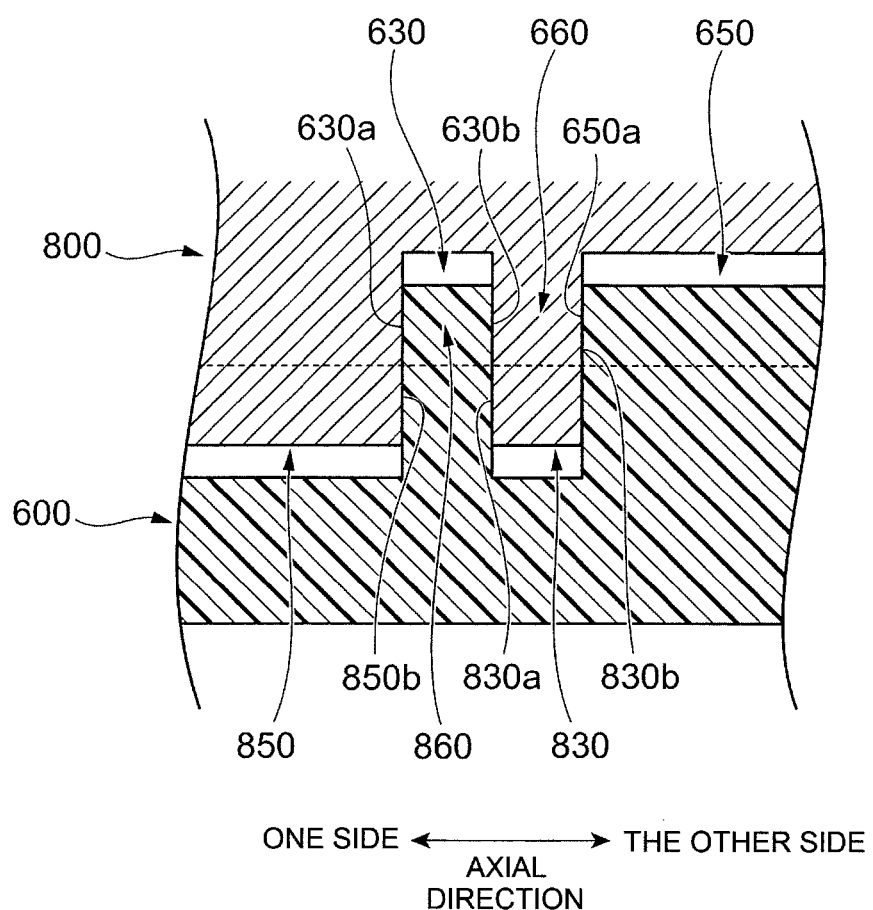

STEERING APPARATUS

CROSS-REFERENCE TO RELATED APPLICATIONS

This application is based on and claims priority under 35 USC 119 from Japanese Patent Application No. 2014-067197 filed on Mar. 27, 2014, the entire content of which is incorporated herein by reference.

BACKGROUND OF THE INVENTION

1. Field of the Invention

The present invention relates to a steering apparatus.

2. Description of Related Art

A steering apparatus of a vehicle and the like is provided with an input portion receiving an input of a steering force from a steering portion such as a steering wheel and an output portion receiving the steering force and transmitting the steering force to steered portions such as wheels. In the steering apparatus, a rack and pinion mechanism including a pinion shaft and a rack shaft having a rack connected to a pinion of the pinion shaft for transmitting the force from the input portion to the output portion is used.

In the rack and pinion mechanism, a bush for supporting the sliding in an axial direction of the rack shaft to be engaged with the pinion shaft may be used. The bush is made of, for example, resin, and is provided so as to be fitted to a housing accommodating the rack shaft or a groove portion formed in a cylindrical rack stopper provided in the housing.

For example, there is disclosed, in JP-A-11-198827 (Patent Document 1) a bush having ring-shaped concave portions in a cylindrical rack stopper and formed through injection molding using a rack stopper body as one part of a die.

SUMMARY OF THE INVENTION

Incidentally, in the steering apparatus having the bush, loosening, namely, backlash may occur in the axial direction of the rack shaft between the bush and the ring-shaped concave portion where the bush is provided depending on ambient temperature (outdoor temperature). The backlash can generate abnormal noise when the rack shaft moves in the axial direction.

An object of the present invention is to suppress the loosening of the bush even when the ambient temperature varies.

According to an embodiment of the present invention, there is provided a steering apparatus including a rack shaft moving steered portions based on a steering in a steering portion, a cover portion covering the rack shaft and having, on an inner peripheral surface of the cover portion facing the rack shaft, an inner peripheral groove extending along a circumferential direction of the rack shaft and a bush arranged inside the inner peripheral groove of the cover portion and supporting the rack shaft so as to slide, in which one of a bottom portion of the inner peripheral groove and an outer peripheral surface of the bush has plural convex portions protruding to the other of them at different positions in an axial direction of the rack shaft, and the other of them has plural concave portions receiving the convex portions.

Here, it is preferable that the bottom portion of the inner peripheral groove and the outer peripheral surface of the bush have linear expansion coefficients different from each other.

It is also preferable that the convex portions are provided at both ends of the bush in the axial direction of the rack shaft and extending in the circumferential direction of the rack shaft.

It is also preferable that bottom portions of the concave portions and outer peripheral surfaces of the convex portions have gaps in the radial direction around the rack shaft.

It is also preferable that the bush has a dimension in which gaps are formed at both ends in the axial direction of the rack shaft in a state of being arranged in the inner peripheral groove.

According to another embodiment of the present invention, there is provided a steering apparatus including a rack shaft moving steered portions based on a steering in a steering portion, a cover portion covering the rack shaft and having an inner peripheral surface facing the rack shaft and a bush held by the inner peripheral surface of the cover portion and supporting the rack shaft so as to slide, in which the cover portion includes a first convex portion protruding from the inner peripheral surface to an inner side in a radial direction around the rack shaft and a first concave portion recessed from the inner peripheral surface to an outer side in the radial direction, the bush includes a second convex portion protruding from an outer peripheral surface to an outer side in the radial direction around the rack shaft and arranged in the first concave portion, and a second concave portion recessed from the outer peripheral surface to the inner side in the radial direction, inside which the first convex portion is arranged, and at least one of the first convex portion and the second convex portion is engaged with the second concave portion or the first concave portion.

It is preferable that the first convex portion and the first concave portion of the cover portion are arranged at positions adjacent to each other in the axial direction of the rack shaft, and the second convex portion and the second concave portion of the bush are provided at positions adjacent to each other in the axial direction of the rack shaft.

According to the present invention, it is possible to suppress the loosening of the bush even when the ambient temperature varies.

BRIEF DESCRIPTION OF THE DRAWINGS

FIG. 6 is a view for explaining a bush and an end case according to another embodiment.

DETAILED DESCRIPTION OF THE INVENTION

Description of Embodiments

Hereinafter, embodiments of the present invention will be explained in detail with reference to the attached drawings.

[Entire Structure of Motor-Driven Power Steering Apparatus]

Figure 1:
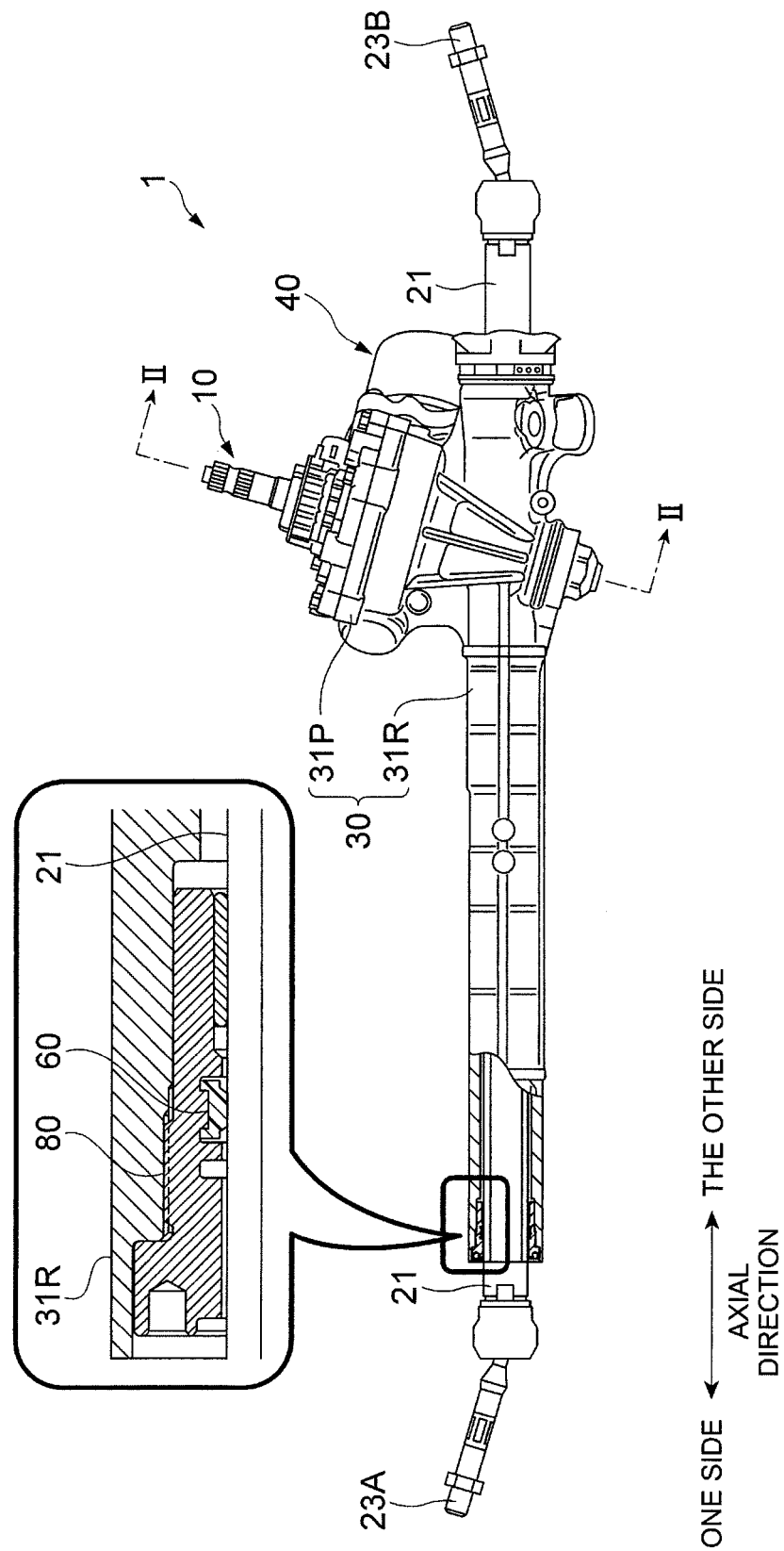
FIG. 1 is a schematic front view of a motor-driven power steering apparatus.

FIG. 1 is a schematic front view of a motor-driven power steering apparatus 1.

Figure 2:
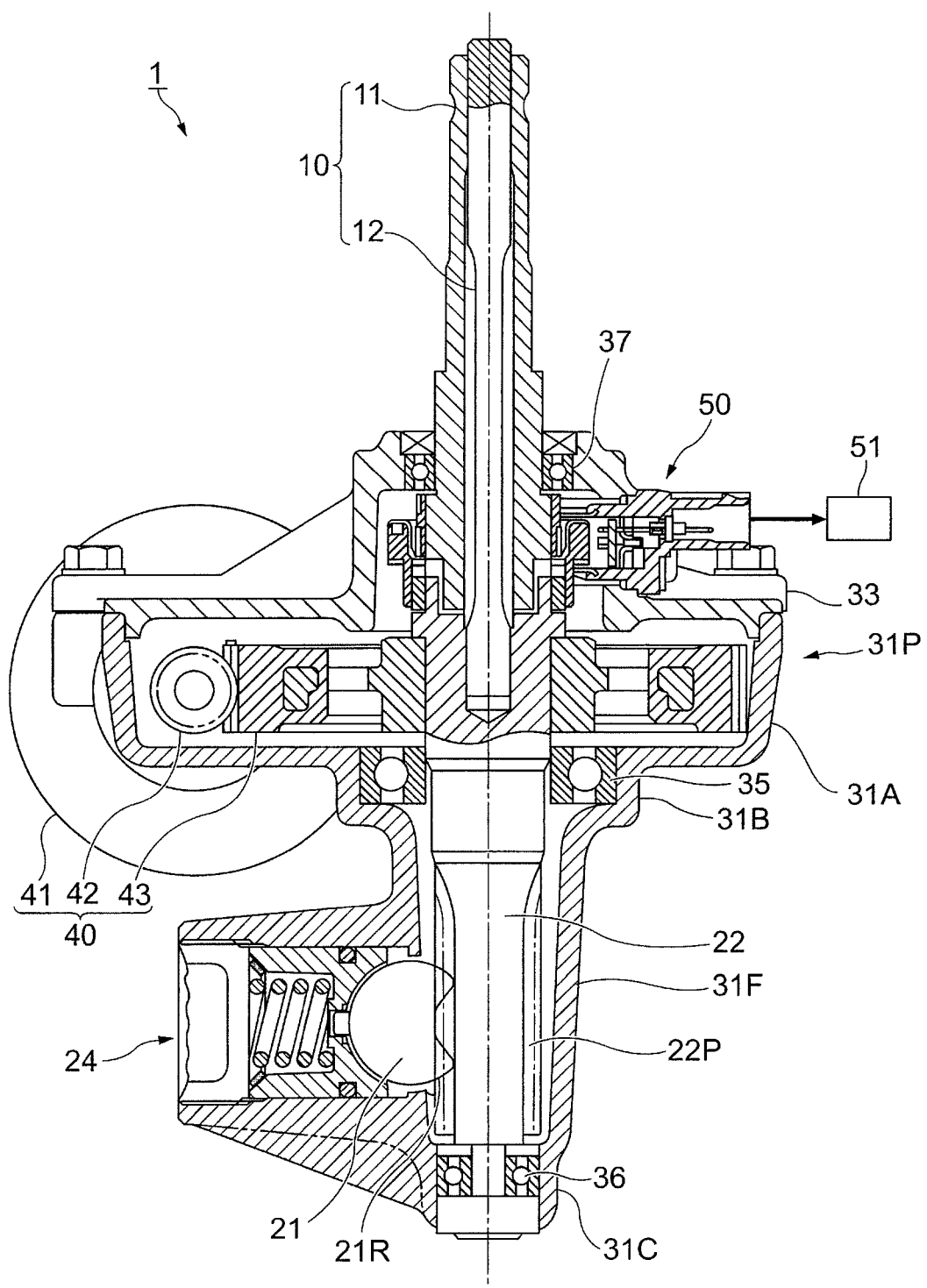
FIG. 2 is a cross-sectional view taken along II-II line of the motor-driven power steering apparatus shown in FIG. 1.

FIG. 2 is a cross-sectional view taken along II-II line of the motor-driven power steering apparatus 1 shown in FIG. 1.

The motor-driven power steering apparatus (steering apparatus) 1 according to an embodiment is a steering apparatus for arbitrarily changing a travelling direction of a vehicle, and a structure applied to a wheeled vehicle, particularly, a motorcar is shown as an example in the embodiment. The motor-driven power steering apparatus 1 according to the embodiment is a so-called pinion-assist type apparatus.

As shown in FIG. 1, the motor-driven power steering apparatus 1 includes an input portion 10 to which a steering force from a steering wheel (a not-shown steering portion) operated by a driver is inputted, a rack shaft 21 connected to, for example, wheels (not-shown steered portions) and changing directions of the wheels and a pinion shaft 22 (see FIG. 2) receiving a torque from the input portion 10 and moving the rack shaft 21 in the axial direction.

The motor-driven power steering apparatus 1 also includes tie rods 23A and 23B provided at end portions of the rack shaft 21 and connected to, for example, the wheels through knuckle arms (not shown), a housing 30 accommodating various kinds of members and an assist portion 40 giving a steering assist force to the pinion shaft 22.

In the following explanation, the axial direction of the rack shaft 21 (a right and left direction of FIG. 1) may be referred to merely as an axial direction, one side in the axial direction of the rack shaft 21 (a left side of FIG. 1) may be referred to merely as one side and the other side in the axial direction of the rack shaft 21 (a right side of FIG. 1) may be referred to merely as the other side. A circumferential direction with respect to the central axis of the rack shaft 21 may be referred to merely as a circumferential direction and a radial direction with respect to the central axis of the rack shaft 21 may be referred to merely as a radial direction.

As shown in FIG. 2, the motor-driven power steering apparatus 1 includes a rack guide 24 pushing the rack shaft 21 toward the pinion shaft 22, a torque detecting apparatus 50 detecting a steering torque of the steering wheel and an electronic control unit (ECU) 51.

The input portion 10 includes an input shaft 11 to which the steering force from the steering wheel operated by the driver is transmitted and a torsion bar 12 installed inside the input shaft 11 as shown in FIG. 2.

The rack shaft 21 is, for example, a long cylindrical member made of iron, having a rack 21R formed by plural teeth aligned in the axial direction. The rack shaft 21 is installed so that the rack 21R is engaged with a later-described pinion 22P of the pinion shaft 22. The rack shaft 21 moves in the axial direction when receiving the rotation of the pinion shaft 22.

The pinion shaft 22 is a member in which the pinion 22P is formed as shown FIG. 2. As described above, the pinion 22P of the pinion shaft 22 is connected to the rack 21R of the rack shaft 21. Then, a rotation force of the pinion shaft 22 is converted to a movement of the rack shaft 21 in the axial direction by the pinion shaft 22 and the rack shaft 21.

The pinion shaft 22 is also connected to the torsion bar 12. Therefore, the pinion shaft 22 rotates by receiving the steering force from the input shaft 11 through the torsion bar 12. In the embodiment, a later-described worm wheel 43 of the assist portion 40 is connected to the pinion shaft 22.

Therefore, the pinion shaft 22 rotates by receiving the steering assist force from the assist portion 40 in addition to the steering force from the input shaft 11.

As shown in FIG. 1, the housing 30 is, for example, made of aluminum, and formed by including a rack housing 31R chiefly accommodating the rack shaft 21 and a pinion housing 31P chiefly accommodating the pinion shaft 22 (see FIG. 2).

The rack housing 31R is an approximately cylindrical member and is formed so as to extend in the axial direction of the rack housing 21. The rack housing 31R also includes a bush 60 and an end case 80 inside the approximately cylindrical portion.

Here, the bush 60 has an approximately ring-shaped outline. The bush 60 is arranged coaxially with the rack shaft 21 inside the rack housing 31R, holding the rack shaft 21 to be inserted inside so as to slide. The end case 80 has an approximately cylindrical outline. The end case 80 is provided so as to be inserted inside the rack housing 31R at an end portion of the rack housing 31R in the axial direction. The end case 80 is also arranged coaxially with the rack shaft 21 and supports the bush 60 at an inner peripheral surface. The end case 80 further regulates a movement distance (a stroke amount) in the axial direction of the rack shaft 21 as part of the rack shaft 21 (or part of a member moving with the rack shaft 21) abuts on the end case 80.

The rack housing 31R formed as described above accommodates the rack shaft 21 so as to move in the axial direction through the bush 60.

The pinion housing 31P has an approximately cylindrical outline. The pinion housing 31P is provided so that a cylinder axis direction crosses the axial direction of the rack housing 31R. The pinion housing 31P holds the pinion shaft 22 so as to be rotatable through a first bearing 35 and a second bearing 36 as shown in FIG. 2. A cover 33 is attached to an opening of the pinion housing 31P. The cover 33 holds the input shaft 11 so as to be rotatable through a third bearing 37.

In the shown example, the worm wheel 43, the first bearing 35 and the second bearing 36 are arranged in order from the center side to an end side in the axial direction of the pinion shaft 22. In the pinion housing 31P, a portion accommodating the worm wheel 43 thereinside is a first outer peripheral portion 31A, a portion accommodating the first bearing 35 thereinside is a second outer peripheral portion 31B, and a portion accommodating the second bearing 36 thereinside is a third outer peripheral portion 31C.

The assist portion 40 is formed by including an electric motor 41, a worm gear 42 and the worm wheel 43 as shown in FIG. 2.

The electric motor 41 is controlled by the electronic control unit (ECU) 51 to rotatively drive the worm gear 42.

The worm gear 42 is coupled to an output shaft of the electric motor 41 and rotating by receiving a driving force from the electric motor.

The worm wheel 43 is coupled to the worm gear 42, to which the driving force from the electric motor 41 is transmitted. Accordingly, a rotation force of the electric motor 41 is decelerated by the worm wheel 43 and transmitted to the pinion shaft 22.

The torque detecting apparatus 50 detects a steering torque of the steering wheel based on a relative rotation angle between the input shaft 11 and the pinion shaft 22, in other words, based on a torsion amount of the torsion bar 12. The steering torque detected by the torque detecting apparatus 50 is transmitted to the electronic control unit 51.

The electronic control unit 51 includes a CPU performing various computing processing, a ROM storing programs executed by the CPU, various data and so on and a RAM used as a work memory and the like of the CPU. The electronic control unit 51 controls driving of the electric motor 41 of the assist portion 40 based on the steering torque obtained by the torque detecting apparatus 50.

In the motor-driven power steering apparatus 1 having the above structure, the steering torque added to the steering wheel appears as the relative rotating angle between the input shaft 11 and the pinion shaft 22, therefore, the torque detecting apparatus 50 obtains the steering torque based on the relative rotation angle between the input shaft 11 and the pinion shaft 22. Then, the electronic control unit 51 obtains the steering torque based on an output value of the torque detecting apparatus 50 and controls the driving of the electric motor 41 based on the obtained steering torque.

Then, the generated torque of the electric motor 41 is transmitted to the pinion shaft 22 through the worm gear 42 and the worm wheel 43. Accordingly, the generated torque of the electric motor 41 assists the steering force of the driver which is added to the steering wheel. That is, the pinion shaft 22 rotates by the steering torque generated by the rotation of the steering wheel and an assist torque given from the electric motor 41. Furthermore, when the rack shaft 21 moves in the axial direction by receiving the rotation of the pinion shaft 22, steering is performed.

[Detailed Structure of Bush 60]

Figure 3:
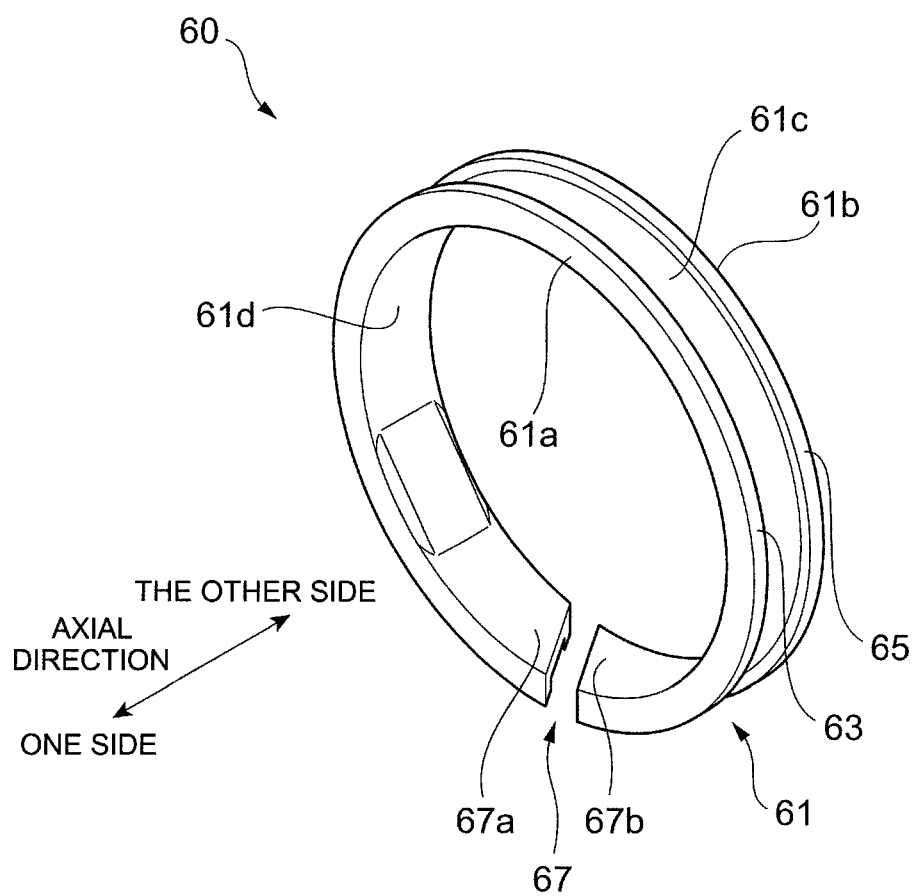
FIG. 3 is a perspective view of a bush.

FIG. 3 is a perspective view of the bush 60.

Figure 4:
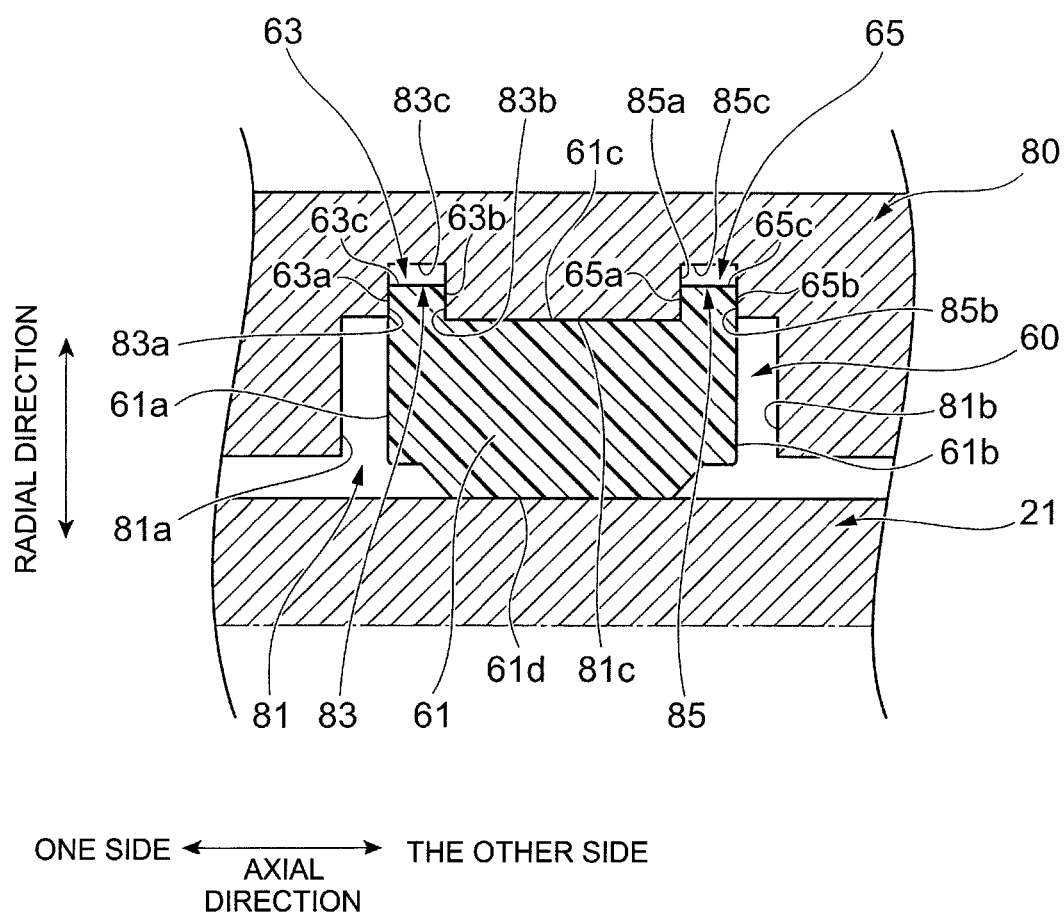
FIG. 4 is an enlarged cross-sectional view showing a periphery of the bush in the motor-driven power steering apparatus shown in FIG. 1.

FIG. 4 is an enlarged cross-sectional view showing a periphery of the bush 60 in the motor-driven power steering apparatus 1 shown in FIG. 1.

Next, detailed structures of the bush 60 and the end case 80 will be explained with reference to FIG. 3 and FIG. 4.

First, the bush 60 will be explained.

As shown in FIG. 3, the bush 60 includes an approximately ring-shaped bush body 61 apart of which in the circumferential direction is cut off, a first protrusion 63 and a second protrusion 65 respectively protruding from an outer peripheral surface 61c (described later) of the bush body 61 toward an outer side in the radial direction and extending in the circumferential direction of the bush body 61, and a separation portion 67 which is a portion where the part of the bush body 61 in the circumferential direction is cut off. The bush 60 is made of a resin member such as polyurethane, polyacetal, polypropylene and polytetrafluoroethylene.

The bush body 61 includes a first surface 61a which is an end surface facing one side in the axial direction, a second surface 61b which is an end surface facing the other side, an outer peripheral surface 61c which is an end surface in the outer peripheral side and an inner peripheral surface 61d which is an end surface in the inner peripheral side in a state where the bush body 61 is arranged inside the end case 80 as shown in FIG. 4.

The first protrusion 63 as an example of a convex portion is a portion an outer diameter of which is larger than the outer peripheral surface 61c at an end portion of the other side of the bush body 61. The first protrusion 63 includes a first surface 63a which is an end surface facing one side, a second surface 63b which is an end surface facing the other side and an outer peripheral surface 63c which is an end surface in the outer peripheral side.

The second protrusion 65 as an example of the convex portion is a portion an outer diameter of which is larger than the outer peripheral surface 61c at an end portion of the other side of the bush body 61. The second protrusion 65 includes a first surface 65a which is an end surface facing one side, a second surface 65b which is an end surface facing the other side and an outer peripheral surface 65c which is an end surface in the outer peripheral side.

As shown in FIG. 3, the separation portion 67 extends in a direction inclined to the axial direction in the example shown in the drawing. Additionally, the bush body 61 of the bush 60 includes one end portion 67a and the other end portion 67b which face each other in the circumferential direction with the separation portion 67 interposed therebetween. As a distance between one end portion 67a and the other end portion 67b in the separation portion 67 is changed, an outer diameter of the bush 61 is changed.

In the shown example, the bush 60 including the first protrusion 63 and the second protrusion 65 are integrally molded by, for example, injection molding.

[Detailed Structure of End Case 80]

Next, the end case 80 will be explained.

As shown in FIG. 4, the end case 80 as an example of a cover portion is a member having an approximately cylindrical outline, and an outer periphery thereof is held by the rack housing 31R (see FIG. 1).

The end case 80 includes an inner peripheral groove (ring-shaped groove) 81 provided in a ring shape and receiving the bush 60 in the inner peripheral surface. The end case 80 also has a first groove 83 and a second groove 85 in a bottom portion 81c (described later) of the inner peripheral groove 81.

The end case 80 is made of a metal member such as aluminum. In more detail, the end case 80 in the shown example is made of a member having a smaller thermal deformation amount than that of the bush 60, namely, a member having a small linear expansion coefficient. Here, the linear expansion coefficient means a ratio in which the length is changed in accordance with the temperature increase.

The inner peripheral groove 81 is an approximately ring-shaped groove recessed from the inner peripheral surface of the end case 80 toward the outer side in the radial direction as well as extending in the circumferential direction. The inner peripheral groove 81 includes a first surface 81a which has an approximately rectangular shape in cross section and is an end surface positioned in the direction of one side, a second surface 81b which is an end surface positioned in the other side and the bottom portion 81c which is an end surface in an outer side of the radial direction. Here, the inner peripheral groove 81 in the shown example has a length in the axial direction longer than a length of the bush 60 (bush body 61) in the axial direction.

The first groove 83 as an example of a concave portion is an approximately ring-shaped groove recessed from the bottom portion 81c of the inner peripheral groove 81 toward the outer side in the radial direction as well as extending in the circumferential direction. The first groove 83 includes a first surface 83a which has an approximately rectangular shape in cross section and is an end surface positioned in the direction of one side, a second surface 83b which is an end surface positioned in the other side and a bottom portion 83c which is an end surface in an outer side of the radial direction. Here, a length of the first groove 83 in the shown example in the axial direction is a dimension in which the first protrusion 63 of the bush 60 is fitted inside the first groove 83.

The second groove 85 as an example of a concave portion is an approximately ring-shaped groove recessed from the bottom portion 81c of the inner peripheral groove 81 toward the outer side in the radial direction at a position closer to the other side than the first groove 83 in the axial direction as well as extending in the circumferential direction. The second groove 85 includes a first surface 85*a* which has an approximately rectangular shape in cross section and is an end surface positioned in the direction of one side, a second surface 85*b* which is an end surface positioned in the other side and a bottom portion 85*c* which is an end surface in the outer side of the radial direction. Here, a length of the second groove 85 in the shown example in the axial direction is a dimension in which the second protrusion 65 of the bush 60 is fitted inside the second groove 85.

[Assembly of Bush 60 to End Case 80]

Next, the assembly of the bush 60 with respect to the end case 80 will be explained as shown in FIG. 4.

First, the bush 60 is arranged inside the inner peripheral groove 81 of the end case 80, for example, while reducing the distance between one end portion 67*a* and the other end portion 6 7*b* of the bush body 61 to reduce the outer diameter. When the bush 60 is arranged inside the inner peripheral groove 81, the outer diameter of the bush 60 is expanded due to an elastic force of the bush body 61. At this time, the first protrusion 63 and the second protrusion 65 of the bush 60 are fitted to the first groove 83 and the second groove 85 respectively provided in the bottom portion 81*c* of the inner peripheral groove 81. In other words, the first protrusion 63 and the second protrusion 65 are press-fitted to the first groove 83 and the second groove 85. Accordingly, the bush 60 is fixed to the end case 80.

[Positional Relationships Between Bush 60 and End Case 80]

Here, positional relationships between the bush 60 and the end case 80 will be explained with reference to FIG. 4.

First, a positional relationship in the radial direction will be explained. In a state where the bush 60 is arranged inside the inner peripheral groove 81, the bottom portion 81*c* of the inner peripheral groove 81 faces the outer peripheral surface 61*c* of the bush body 61.

In the shown example, the bottom portion 83*c* of the first groove 83 is separated from the outer peripheral surface 63*c* of the first protrusion 63 and the bottom portion 85*c* of the second groove 85 is separated from the outer peripheral surface 65*c* of the second protrusion 65. That is, outer peripheries of the first protrusion 63 and the second protrusion 65 of the bush 60 are arranged in a so-called clearance setting. Here, as the outer peripheries of the first protrusion 63 and the second protrusion 65 are arranged in the clearance setting, the first protrusion 63 and the second protrusion 65 are allowed to expand to the outer side in the radial direction when the ambient temperature (outdoor temperature) varies and the bush 60 is expanded.

Next, a positional relationship in the axial direction will be explained. In the state where the bush 60 is arranged inside the inner peripheral groove 81, a gap is formed between the first surface 81*a* of the inner peripheral groove 81 and the first surface 61*a* of the bush 60, and a gap is formed between the second surface 81*b* of the inner peripheral groove 81 and the second surface 61*b* of the bush 60. That is, both ends of the bush 60 in the axial direction are arranged in the clearance setting. Here, as the both ends of the bush 60 in the axial direction are arranged in the clearance setting, the bush 60 is allowed to expand in the radial direction when the ambient temperature (outdoor temperature) varies and the bush 60 is expanded.

When the expansion of the bush in the axial direction is limited, which is different from the shown example, the bush 60 can expand toward an inner side in the radial direction. If the bush 60 expands to the inner side in the radial direction, bush 60 gives resistance (sliding resistance) to the movement of the rack shaft 21 in the axial direction.

When an expansion amount of the bush 60 to the inner side in the radial direction is large, the bush 60 may bite the rack shaft 21 (the bush 60 may be fixed to the rack shaft 21). In this case, the bush 60 moves in the axial direction as the rack shaft 21 moves in the axial direction, and the bush 60 collides with the first surface 81*a* or the second surface 81*b* in the inner peripheral groove 81, which causes abnormal noise.

[Variation of Position in Axial Direction Caused by Temperature Variation]

Figure 5A:
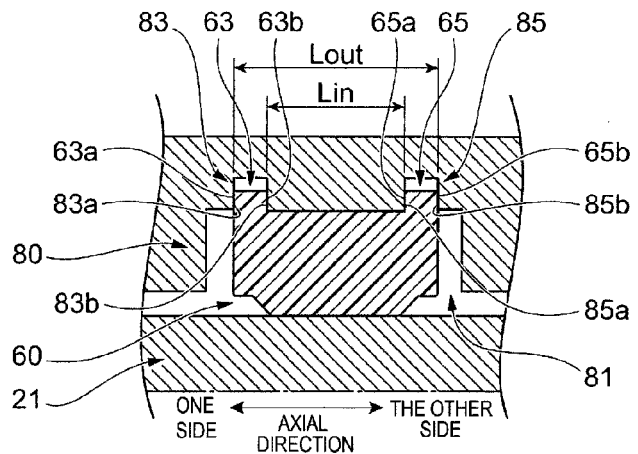
FIGS. 5A, 5B and 5C are views for explaining variation of positional relationships between protrusions of the bush and grooves of an end case caused by temperature variation.
Figure 5B:
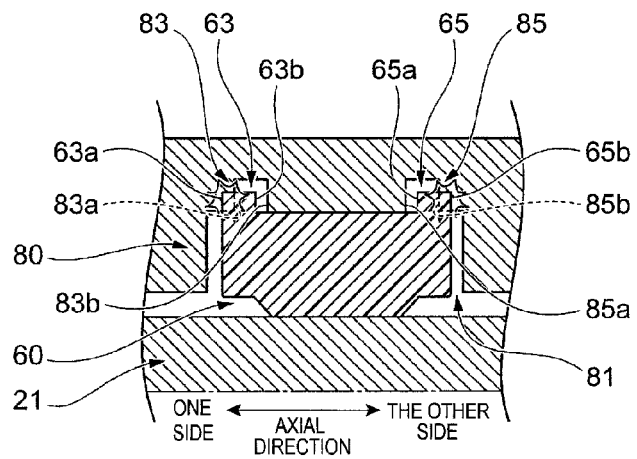
Figure 5C:
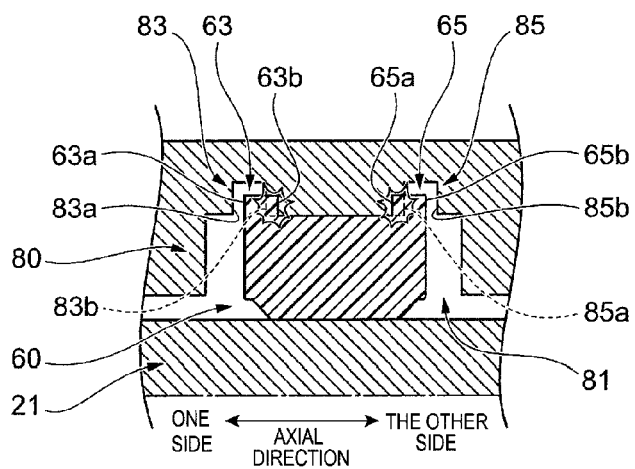

FIGS. 5A to 5C are views for explaining variation of positional relationships between the protrusions (the first protrusion 63, the second protrusion 65) of the bush 60 and the grooves (the first groove 83, the second groove 85) of the end case 80 caused by temperature variation.

Next, the variation of positional relationships between the protrusions (the first protrusion 63, the second protrusion 65) of the bush 60 and the grooves (the first groove 83, the second groove 85) of the end case 80 in the axial direction caused by temperature variation will be explained.

Here, a positional relationship in the axial direction in a temperature to be the reference (reference temperature, for example, room temperature) will be explained first, then, positional relationships in the axial direction in a temperature (high temperature) higher than the reference temperature and in a temperature (lower temperature) lower than the reference temperature will be explained.

As shown in FIG. 5A, the positional relationship in the reference temperature is as follows. That is, the first protrusion 63 and the second protrusion 65 of the bush 60 are respectively fitted to the first groove 83 and the second groove 85 of the end case 80. Specifically, the first surface 63*a* and the second surface 63*b* of the first protrusion 63 and the first surface 83*a* and the second surface 83*b* of the first groove 83 press each other, respectively. Also, the first surface 65*a* and the second surface 65*b* of the second protrusion 65 and the first surface 85*a* and the second surface 85*b* of the second groove 85 press each other, respectively.

Additionally, a length from the first surface 63*a* of the first protrusion 63 to the second surface 65*b* of the second protrusion 65 in the axial direction coincide with a length from the first surface 83*a* of the first groove 83 to the second surface 85*b* of the second groove 85 in the axial direction (see a distance Lout). A length from the second surface 63*b* of the first protrusion 63 to the first surface 65*a* of the second protrusion 65 in the axial direction coincide with a length from the second surface 83*b* of the first groove 83 to the first surface 85*a* of the second groove 85 in the axial direction (see a distance Lin).

Next, as shown in FIG. 5B, the positional relationship in the temperature (high temperature) higher than the reference temperature will be explained.

First, the bush 60 has a higher linear expansion coefficient than that of the end case 80. Accordingly, a length of the bush 60 extended in the axial direction by thermal expansion is larger than a length of the end case 80 extended in the axial direction as compared with the case of the reference temperature. Therefore, the length from the first surface 63*a* of the first protrusion 63 to the second surface 65*b* of the second protrusion 65 in the axial direction is going to be longer than the length from the first surface 83*a* of the first groove 83 to the second surface 85*b* of the second groove 85 in the axial direction as thermal expansion proceeds. Accordingly, the bush 60 is stretched in the axial direction through the first surface 63a of the first protrusion 63 and the second surface 65b of the second protrusion 65.

That is, the first surface 63a of the first protrusion 63 and the first surface 83a of the first groove 83 press each other, and the second surface 65b of the second protrusion 65 and the second surface 85b of the second groove 85 press each other. Accordingly, the movement of the bush 60 in the axial direction in the inner peripheral groove 81 of the end case 80 is suppressed.

Next, as shown in FIG. 5C, the positional relationship in the temperature (low temperature) lower than the reference temperature will be explained.

As the bush 60 has a higher linear expansion coefficient than that of the end case 80, a length of the bush 60 contracted in the axial direction by the thermal expansion is larger than a length of the end case 80 contracted in the axial direction as compared with the case of the reference temperature. Therefore, the length from the second surface 63b of the first protrusion 63 to the first surface 65a of the second protrusion 65 in the axial direction is going to be shorter than the length from the second surface 83b of the first groove 83 to the first surface 85a of the second groove 85 in the axial direction as thermal contraction proceeds. Accordingly, the bush 60 sandwiches a part of the end case 80 (a portion from the second surface 83b of the first groove 83 to the first surface 85a of the second groove 85 in the axial direction) in the axial direction through the second surface 63b of the first protrusion 63 and the first surface 65a of the second protrusion 65.

That is, the second surface 63b of the first protrusion 63 and the second surface 83b of the first groove 83 press each other, and the first surface 65a of the second protrusion 65 and the first surface 85a of the second groove 85 press each other. Accordingly, the movement of the bush 60 in the axial direction in the inner peripheral groove 81 of the end case 80 is suppressed.

As described above, the movement of the bush 60 in the axial direction in the inner peripheral groove 81 of the end case 80 is suppressed even in the case where the temperature varies.

In the example shown in FIG. 5B, the second surface 63b of the first protrusion 63 and the second surface 83b of the first groove 83 are apart from each other, and the first surface 65a of the second protrusion 65 and the first surface 85a of the second groove 85 are apart from each other. In the example shown in FIG. 5C, the first surface 63a of the first protrusion 63 and the first surface 83a of the first groove 83 are apart from each other, and the second surface 65b of the second protrusion 65 and the second surface 85b of the second groove 85 are apart from each other. Additionally, it is possible to have a structure in which these surfaces are not apart from each other.

[Another Embodiment]

FIG. 6 is a view for explaining a bush 600 and an end case 800 according to another embodiment. FIG. 6 is a view corresponding to FIG. 4 in the above embodiment, which is an enlarged cross-sectional view showing a periphery of the bush 600 in a motor-driven power steering apparatus 1.

In explanation of the above embodiment, the bush 60 has the first protrusion 63 and the second protrusion 65, the end case 80 has the inner peripheral groove 81 and the first groove 83 and the second groove 85 are formed in the inner peripheral groove 81, however, the present invention is not limited to this structure.

For example, the bush 600 and the end case 800 can be formed as shown in FIG. 6.

First, the end case 800 does not have the inner peripheral groove 81 (see FIG. 4) and holds an outer peripheral surface of the bush 600 by an inner peripheral surface of the end case 800.

The bush 600 has a first protruding portion 630 (first convex portion) protruding from the outer peripheral surface to an outer side in the radial direction (end case 800 side) and a second protruding portion 650 protruding from the outer peripheral surface to the outer side in the radial direction at a position apart from the first protruding portion 630 to the other side.

Here, the bush 600 can be seen as a structure in which a first concave portion 660 is provided between the first protruding portion 630 and the second protruding portion 650 in the axial direction. In the shown example, the bush 600 can be seen as a structure in which the first protruding portion 630 and the first concave portion 660 are provided at positions adjacent to each other in the axial direction.

Here, the first protruding portion 630 and the second protruding portion 650 extend in the circumferential direction. The first protruding portion 630 includes a first surface 630a which is an end surface facing one side and a second surface 630b which is an end surface facing the other side. The second protruding portion 650 has a first surface 650a which is an end surface facing one side.

On the other hand, the end case 800 includes a third protruding portion (second convex portion) 830 protruding from the inner peripheral surface to an inner side in the radial direction (bush 600 side) and a fourth protruding portion 850 protruding from the inner peripheral surface to the inner side in the radial direction at a position apart from the third protruding portion 830 to one side.

Here, the end case 800 can be seen as a structure in which a second concave portion 860 is provided between the third protruding portion 830 and the fourth protruding portion 850 in the axial direction. In the shown example, the end case 800 can be seen as a structure in which the third protruding portion 830 and the second concave portion 860 are provided at positions adjacent to each other in the axial direction.

Here, the third protruding portion 830 and the fourth protruding portion 850 extend in the circumferential direction. The third protruding portion 830 includes a first surface 830a which is an end surface facing one side and a second surface 830b which is an end surface facing the other side. The fourth protruding portion 850 has a first surface 850b which is an end surface facing the other side.

Next, a state where the bush 600 is assembled to the end case 800 will be explained.

As shown in FIG. 6, the first protruding portion 630 of the bush 600 is arranged between the fourth protruding portion 850 and the third protruding portion 830 (the second concave portion 860) of the end case 800, and the third protruding portion 830 of the end case 800 is arranged between the first protruding portion 630 and the second protruding portion 650 (the first concave portion 660) of the bush 600. Additionally, the fourth protruding portion 850 of the end case 800, the first protruding portion 630 of the bush 600, the third protruding portion 830 of the end case 800 and the second protruding portion 650 of the bush 600 are arranged in this order along the axial direction.

The first surface 630a of the first protruding portion 630 and the first surface 850b of the fourth protruding portion 850 press (contact) each other, the second surface 630b of the first protruding portion 630 and the first surface 830a of the third protruding portion 830 press (contact) each other and the first surface 650a of the second protruding portion 650 and the second surface 830b of the third protruding portion 830 press (contact) each other.

The first protruding portion 630 of the bush 600 is arranged in the second concave portion 860 of the end case 800 and the third protruding portion 830 of the end case 800 is arranged in the first concave portion 660 of the bush 600 as described above, thereby suppressing the movement of the bush 600 in the axial direction of the end case 800 even when the temperature varies.

Here, explanation will be made by citing a case where the linear expansion coefficient is smaller in the end case 800 than in the bush 600 as an example. In the high-temperature state, the first protruding portion 630 of the bush 600 is expanded, and the first protruding portion 630 is stretched in the axial direction inside the second concave portion 860 of the end case 800. In the low-temperature state, a portion between the second surface 630b of the first protruding portion 630 and the first surface 650a of the second protruding portion 650 is contracted, the first protruding portion 630 and the second protruding portion 650 sandwich the third protruding portion 830 in the axial direction. Accordingly, the movement of the bush 600 in the axial direction of the end case 800 is suppressed even when the temperature varies.

Note that the movement of the bush 600 in the axial direction of the end case 800 is suppressed regardless of temperature variation also when the linear expansion coefficient is larger in the end case 800 than in the bush 600, the detailed explanation of which is omitted.

The case where the end case 800 does not have the inner peripheral groove 81 (see FIG. 4), and the third protruding portion 830 and the fourth protruding portion 850 are included in the inner peripheral surface of the end case 800 has been explained. However, the present invention is not limited to this structure, and it is possible to apply a structure in which the end case 800 has the inner peripheral groove 81, and the third protruding portion 830 and the fourth protruding portion 850 are included in the bottom portion 81c (see FIG. 4) of the inner peripheral groove 81.

MODIFICATION EXAMPLES

Figure 7A:
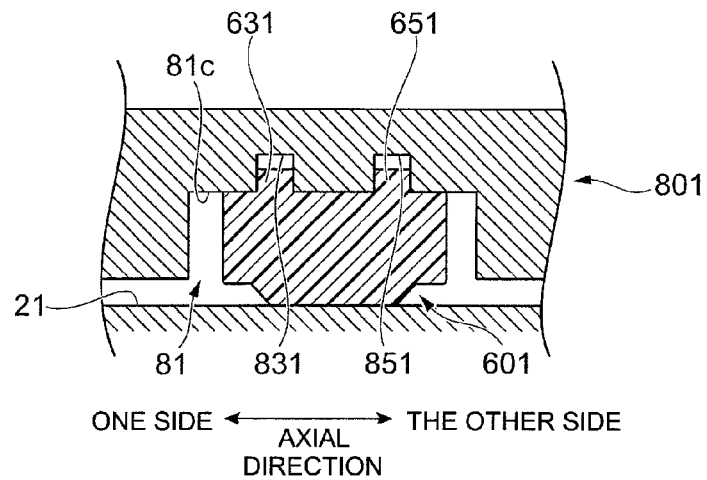
FIGS. 7A, 7B and 7C are views for explaining modification examples of the bush and the end case.
Figure 7B:
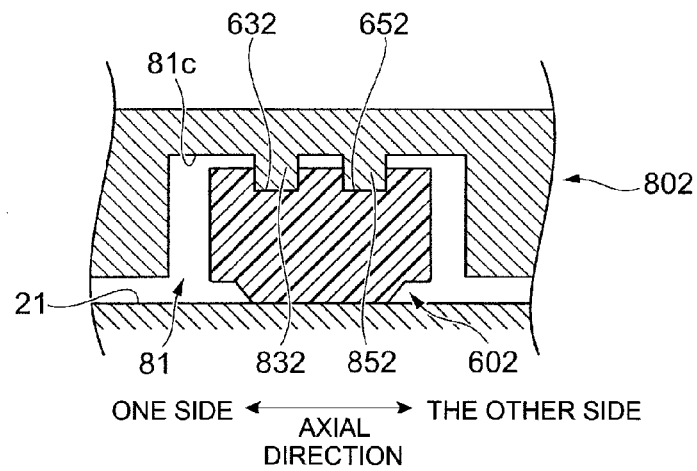
Figure 7C:
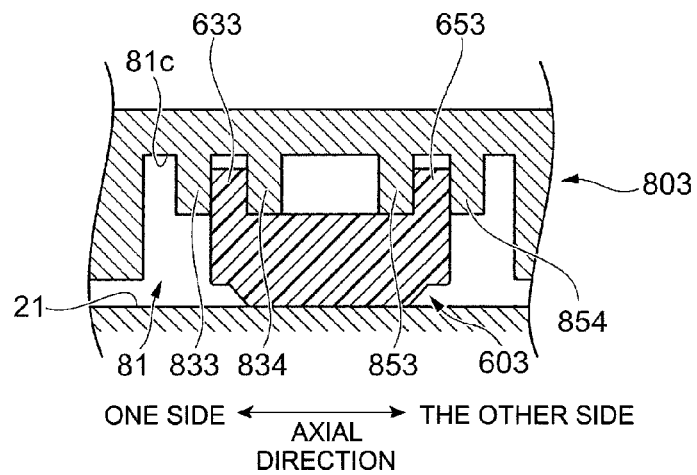

FIGS. 7A to 7C are views for explaining modification examples of the bush 60 and the end case 80.

The bush 60 and the end case 80 according to the embodiment can be formed to have structures in modification examples explained below. In FIGS. 7A to 7C, the same components as those of the embodiment shown in FIG. 4 are denoted by the same symbols and the detailed explanation is omitted.

First, in the embodiment explained with reference to FIG. 3, the structure in which the first protrusion 63 and the second protrusion 65 are provided at both ends of the bush 60 in the axial direction has been explained. However, it is also preferable to a structure in which a first protrusion 631 and a second protrusion 651 are provided in the central side as compared with both ends of the bush 601 in the axial direction as shown in FIG. 7A. In this structure, an end case 801 includes a first groove 831 and a second groove 851 at positions corresponding to the first protrusion 631 and the second protrusion 651 in the bottom portion 81c of the inner peripheral groove 81.

Additionally, the first protrusion 631 and the second protrusion 651 may be provided at any positions in the axial direction. However, when a distance between the first protrusion 631 and the second protrusion 651 in the axial direction is increased, a deformation amount of the distance between the first protrusion 631 and the second protrusion 651 due to the temperature variation is increased, as a result, a force of fixing the bush 601 and the end case 801 to each other is increased.

The structure in which the bush 601 has two protrusions which are the first protrusion 631 and the second protrusion 651 and the end case 801 has two grooves which are the first groove 831 and the second groove 851 has been explained as the above, however, a structure in which the respective members have three or more protrusions or grooves may be applicable.

Moreover, in the embodiment explained with reference to FIG. 3, the structure in which the bush 60 has the first protrusion 63 and the second protrusion 65 has been explained. However, it is also applicable to apply a structure in which a bush 602 has grooves on an outer peripheral surface as shown in FIG. 7B. Specifically, the bush 602 includes a first groove 632 recessed toward the inner side in the radial direction and a second groove 652 recessed toward the inner side in the radial direction at a position apart from the first groove 632 to the other side on the outer peripheral surface. Both of these first groove 632 and the second groove 652 extend in the circumferential direction. An end case 802 in this structure includes a first protrusion 832 and a second protrusion 852 protruding from the bottom portion 81c to the inner side in the radial direction at positions corresponding to the first groove 632 and the second groove 652 in the bottom portion 81c of the inner peripheral groove 81.

Furthermore, in the embodiment explained with reference to FIG. 3, the structure in which the bush 60 has the first protrusion 63 and the second protrusion 65, and the end case 80 includes the first groove 83 and the second groove 85 has been explained. However, it is also applicable to apply a structure in which a bush 603 has protrusions on the outer peripheral surface as well as the bottom portion 81c of the inner peripheral groove 81 in an end case 803 has protrusions as shown in FIG. 7C.

Specifically, the bush 603 includes a first protrusion 633 protruding toward the outer side in the radial direction and a second protrusion 653 protruding toward the outer side in the radial direction at a position apart from the first protrusion 633 to the other side on the outer peripheral surface. Then, the end case 803 includes a third protrusion 833, a fourth protrusion 834, a fifth protrusion 835 and a sixth protrusion 854 protruding from the bottom portion 81c to the inner side in the radial direction at positions in the bottom portion 81c of the inner peripheral groove 81 where these protrusions sandwich the first protrusion 633 and the second protrusion 653 respectively in the axial direction.

The structure in which the first protrusion 63, the second protrusion 65, the first groove 83, the second groove 85 and so on are provided along the circumferential direction has been explained as the above, however, it is also applicable that these may be provided over the entire portion in the circumferential direction as well as may be provided along some portions in the circumferential direction. In other words, the first protrusion 63, the second protrusion 65, the first groove 83, the second groove 85 and so on can be provided in the entire circumference as well as can be provided intermittently along the circumferential direction.

Also, the structure in which the bush is made of resin and the end case 80 is made of metal has been explained as the above, however, materials are not limited to the above as long as linear expansion coefficients of the bush 60 and the end case 80 are different from each other. For example, the bush 60 and the end case may be made of various materials, for example, they can be both made of resin, or both made of metal as well as may be made by combination with other members.

In the above structure, effects on a sliding property between the bush 60 and the rack shaft 21 can be suppressed even when the ambient temperature varies, though the detailed explanation is omitted in the above description.

For example, the structure in which the end case 80 is made of aluminum and the rack shaft 21 is made of iron will be explained as an example with reference to FIG. 4. The linear expansion coefficient is higher in the end case 80 made of aluminum than in the rack shaft 21 made of iron in this structure.

Accordingly, a clearance between the rack shaft 21 and the end case 80 in the radial direction is increased when the temperature is high, and effects on the sliding property between the bush 60 and the rack shaft 21 is suppressed when the bush 60 is thermally expanded. On the other hand, the clearance between the rack shaft 21 and the end case 80 in the radial direction is reduced when the temperature is low, and effects on the sliding property between the bush 60 and the rack shaft 21 is suppressed when the bush 60 is thermally contracted.

The relationship between the bush 60 and the end case 80 has been explained as the above, and the explanation can be applied to the relationship between the bush 60 and a member covering the bush 60. As further explanation, the above explanation can be also applied to the relationship between the bush 60 and the housing 30, for example, in the case where the housing 30 supports the bush 60 not through the end case 80.

Additionally, the end case 80 may be integrally formed with the housing 30 (the rack housing 31R). Accordingly, the above explanation may be applied to the relationship between the bush 60 and a member in which the end case 80 is integrally formed with the housing 30 as a member covering the bush 60.

The various embodiments and modification examples have been explained as the above, and it is naturally preferable that these embodiments and modification examples are combined with each other.

The present disclosure is not limited to the above embodiments at all, and can be achieved in various forms within a scope not departing from the gist of the present disclosure.

What is claimed is:

1. A steering apparatus comprising:
   a rack shaft moving steered portions based on a steering in a steering portion;
   a cover portion covering the rack shaft and having, on an inner peripheral surface of the cover portion facing the rack shaft, an inner peripheral groove extending along a circumferential direction of the rack shaft; and
   a bush arranged inside the inner peripheral groove of the cover portion and supporting the rack shaft so as to slide,
   wherein one of a bottom portion of the inner peripheral groove and an outer peripheral surface of the bush has plural protruding portions protruding to other of the bottom portion of the inner peripheral groove and the outer peripheral surface of the bush at different positions in an axial direction of the rack shaft,
   the other of the bottom portion of the inner peripheral groove and the outer peripheral surface of the bush has plural recessed portions receiving the protruding portions, and
   the bush has a dimension in which gaps are formed between the bush and the cover portion at both ends of the bush in the axial direction of the rack shaft in a state of being arranged in the inner peripheral groove.

2. The steering apparatus according to claim 1, wherein the bottom portion of the inner peripheral groove and the outer peripheral surface of the bush have linear expansion coefficients different from each other.

3. The steering apparatus according to claim 1, wherein the protruding portions are provided at both ends of the bush in the axial direction of the rack shaft and extending in the circumferential direction of the rack shaft.

4. The steering apparatus according to claim 2, wherein the protruding portions are provided at both ends of the bush in the axial direction of the rack shaft and extending in the circumferential direction of the rack shaft.

5. The steering apparatus according to claim 1, wherein gaps are formed between bottom surfaces of the recessed portions and respective outer peripheral surfaces of the protruding portions in a radial direction around the rack shaft.

6. The steering apparatus according to claim 2, wherein bottom portions of the recessed portions and outer peripheral surfaces of the protruding portions have gaps in a radial direction around the rack shaft.

7. The steering apparatus according to claim 3, wherein bottom portions of the recessed portions and outer peripheral surfaces of the protruding portions have gaps in a radial direction around the rack shaft.

8. The steering apparatus according to claim 4, wherein bottom portions of the recessed portions and outer peripheral surfaces of the protruding portions have gaps in a radial direction around the rack shaft.

9. The steering apparatus according to claim 2, wherein the bush has a dimension in which gaps are formed at both ends of the bush in the axial direction of the rack shaft in a state of being arranged in the inner peripheral groove.

10. The steering apparatus according to claim 3, wherein the bush has a dimension in which gaps are formed at both ends of the bush in the axial direction of the rack shaft in a state of being arranged in the inner peripheral groove.

11. The steering apparatus according to claim 4, wherein the bush has a dimension in which gaps are formed at both ends of the bush in the axial direction of the rack shaft in a state of being arranged in the inner peripheral groove.

12. The steering apparatus according to claim 5, wherein the bush has a dimension in which gaps are formed at both ends of the bush in the axial direction of the rack shaft in a state of being arranged in the inner peripheral groove.

13. The steering apparatus according to claim 6, wherein the bush has a dimension in which gaps are formed at both ends of the bush in the axial direction of the rack shaft in a state of being arranged in the inner peripheral groove.

14. The steering apparatus according to claim 7, wherein the bush has a dimension in which gaps are formed at both ends of the bush in the axial direction of the rack shaft in a state of being arranged in the inner peripheral groove.

15. The steering apparatus according to claim 8,
wherein the bush has a dimension in which gaps are formed at both ends of the bush in the axial direction of the rack shaft in a state of being arranged in the inner peripheral groove.

16. A steering apparatus comprising:
a rack shaft moving steered portions based on a steering in a steering portion;
a cover portion covering the rack shaft and having an inner peripheral surface facing the rack shaft; and
a bush held by the inner peripheral surface of the cover portion and supporting the rack shaft so as to slide,
wherein the cover portion comprises a first protruding portion protruding from the inner peripheral surface to an inner side in a radial direction around the rack shaft and a first recessed portion recessed from the inner peripheral surface to an outer side in the radial direction,
the bush comprises a second protruding portion protruding from an outer peripheral surface of the bush to an outer side in the radial direction around the rack shaft and arranged inside the first recessed portion, and a second recessed portion recessed from the outer peripheral surface of the bush to an inner side in the radial direction, inside which the first protruding portion is arranged,
at least one of the first protruding portion and the second recessed portion is engaged with the second recessed portion or the first recessed portion,
the first protruding portion and the first recessed portion of the cover portion are arranged at positions immediately adjacent to each other in the axial direction of the rack shaft, and
the second protruding portion and the second recessed portion of the bush are provided at positions immediately adjacent to each other in the axial direction of the rack shaft.

17. The steering apparatus according to claim 16, wherein the first protruding portion and the first recessed portion of the cover portion share a common surface.

18. The steering apparatus according to claim 17, wherein the common surface is formed perpendicular relative to the axial direction of the rack shaft.

* * * * *